(12) United States Patent
Wilson et al.

(10) Patent No.: US 6,583,944 B1
(45) Date of Patent: Jun. 24, 2003

(54) METHOD AND SYSTEM FOR COMPENSATION FOR SPIN SPEED VARIATION IN A MAGNETIC DISK STORAGE DEVICE

(75) Inventors: Aaron W. Wilson, Berthoud, CO (US); Rodney A. Mattison, Louisville, CO (US); Russell B. Josephson, Berthoud, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 225 days.

(21) Appl. No.: 09/644,318

(22) Filed: Aug. 23, 2000

(51) Int. Cl.[7] ............................ G11B 5/09; G11B 19/04; G11B 15/46

(52) U.S. Cl. ..................... 360/51; 360/60; 360/73.03

(58) Field of Search .................. 360/60, 73.03, 360/31, 51, 75

(56) References Cited

U.S. PATENT DOCUMENTS

| | | | |
|---|---|---|---|
| 5,477,103 A | 12/1995 | Romano et al. | |
| 5,706,265 A | 1/1998 | Bang | |
| 6,064,535 A | 5/2000 | Wilson et al. | 360/60 |
| 6,072,650 A | 6/2000 | Wilson | 360/51 |
| 6,081,397 A | * 6/2000 | Belser | 360/51 |

FOREIGN PATENT DOCUMENTS

EP 0 907 178 A 4/1999

\* cited by examiner

Primary Examiner—Andrew L. Sniezek
(74) Attorney, Agent, or Firm—Lisa K. Jorgenson; William J. Kubida

(57) ABSTRACT

A method, and a system for implementing such method, for use in a magnetic disk storage system for compensating for variation in spin speed of a data storage media from a nominal or design spin speed. The method includes providing the nominal spin speed for the data storage media in the particular magnetic disk storage system and then measuring the actual spin speed of the data storage media. In one preferred embodiment, the spin speed measurement is completed by measuring the time from one servo position field to the next sequential servo position field in a track on the data storage media. Next, the present spin speed variation is determined by comparing the measured spin speed with the nominal spin speed. A correction factor is calculated based on the spin speed error and applied to at least one data transfer parameter, such as channel reference frequency or read/write gate assertion timing, prior to a subsequent data transfer process (i.e., a read or a write operation). The spin speed compensation method may further include verifying that the measured spin speed is within a range of acceptable spin speeds. The range of acceptable spin speeds is determined based on maximum spin speed change rates of the magnetic disk storage system and the most recent measured spin speed. If the measured spin speed is outside this range, the data transfer operation, i.e., a write operation, is stopped to prevent damaging data previously stored on the data storage media.

14 Claims, 4 Drawing Sheets

METHOD AND SYSTEM FOR COMPENSATION FOR SPIN SPEED VARIATION IN A MAGNETIC DISK STORAGE DEVICE

BACKGROUND OF THE INVENTION

1. Field of the Invention

The present invention relates to the field of data storage devices, and in particular, to magnetic disk storage systems and methods that compensate, on an ongoing and real-time basis, for variations in data storage media spin speeds to improve the capacity of storage media and to control data density on the storage media.

2. Relevant Background.

The use of magnetic disk storage systems for electronically storing data continues to grow worldwide. Along with this increased use, the information industries are demanding higher capacity systems with minimal wasted storage space that also provide high accuracy data storage and retrieval.

In a typical magnetic disk storage system, a user's data is stored in a disk drive device that includes one or more storage media, such as disks, with storage or platter surfaces on each side. On each platter surface of the disk, the user's data is stored, and later retrieved, with a read/write head that is positioned above the platter surface by a connected arm that has its radial movement controlled by an actuator and servo controller. During operation, the disk is rotated on a central spindle connected to a spin motor at a spin speed to move the platter surface relative to the read/write head. The data is typically stored in numerous concentric, circular tracks which are divided into sectors representing the smallest addressable block of data on the platter surface that is read or written.

In addition to the user's data, each track contains information that describes the radial and rotational position of the read/write head relative to the disk and, also, provides location or reference information to the magnetic disk storage system to allow it to know the position of the user data. This information is generally placed in fields, i.e., servo position fields, positioned at regular intervals between the data sectors in each track. This enables the servo controller (or other positioning system) to periodically access the positional information and, in response, to move the arm and/or change spin speed of the disk as needed to accurately position the read/write head. The size of the interval between adjacent servo position fields is established during initial configuration of the disk based on a feedback rate needed to control spin speed and is typically not modified by the user.

Variation in spin speeds within disk drive devices is an ongoing operational problem associated with magnetic disk storage systems that must be addressed by system designers when placing the data sectors on each disk to ensure accurate data storage and retrieval. Each track on a disk includes servo position fields and data sectors that are separated by gaps or spaces that are not available for storing user's data. Further, due to design considerations such as optimizing linear bit density, optimizing the length of position feedback intervals, and the like, it is sometimes necessary for servo position fields to be positioned within a sector, thereby splitting the sector into two fragments creating gaps between each fragment and the servo position field.

Ideally, it would be desirable to minimize the size of these gaps to provide more data storage space, but unfortunately spin speed variation negatively affects sector placement and the size of included gaps in magnetic disk storage systems. In this regard, the designer is forced to provide nominal or minimal gaps that are large enough to avoid overlap of data when data in a first sector is written on the disk at a maximum or high spin speed and in a second, adjacent sector at a minimum or slow spin speed. For example, a track on a disk may have two servo position fields positioned with 90 microseconds of data recording time between them. If the magnetic disk storage system experiences a spin speed variation of plus or minus 0.3 percent, only 89.73 microseconds of data storage is available when the disk is spinning 0.3 percent too fast but 90.27 microseconds is available when the disk is spinning 0.3 percent too slow. If a designer desires, for example, to record a 50 microsecond first sector followed by a second sector in this interval, the designer must assume that the disk is spinning at the maximum spin speed. As a result, this 50 microsecond length of data may require 55.72 percent (i.e., 50 microseconds/89.73 microseconds) of the available space. Consequently, writing of the second sector cannot begin until at least 55.72 percent of the distance between the servo positioning fields has past, even when the disk is spinning at the minimal spin speed. This forces the designer to provide a space of 50.3 microseconds for 50 microseconds of data in the first sector which results in a 0.3 microsecond gap or waste of storage space when the spin speed is design or nominal. A similar "worst case" speed variation determination is made for the placement of each sector. This results in relatively large gaps between sectors and servo positioning fields that reduce available storage space.

In addition to the gaps between sectors and between servo position fields and sectors, the size of the phase locked oscillator (PLO) field included in each sector is typically increased to account for spin speed variation. The PLO field is not useful for user data storage but rather contains timing information that is extracted by the disk drive device. The timing information in the PLO field is coupled with a timing recovery device included in the magnetic disk storage system to synchronize the incoming data stream with data in the sector and to, thereby, compensate for spin speed variations that may have affected the position of the data during writing and reading operations. Disk drive devices are generally designed such that during a read operation, a read or read gate signal is asserted when the read/write head is positioned over a PLO field. If the read gate signal is asserted too soon, the timing recovery device may receive noise or transients that interfere with the synchronization operation. If the read gate signal is asserted too late, an insufficient number of PLO bytes are read and synchronization fails.

As a result, the size of the PLO fields and the selection of a read gate assertion point are chosen with careful attention to the minimum information requirements of the phase locked oscillator but also based on the uncertainty of the data position caused by spin speed variation. Similar to the gap size design considerations, the designer must assume that data in each sector was written at maximum spin speed placing the data as late as possible on the disk and, further, that the data may be read back at minimum spin speed with the read gate asserted as early as possible in the sector. In this case, the assertion point for the read gate must be chosen such that it is always asserted over the PLO field. Additionally, the designer must select the size of the PLO field such that enough bytes of timing information are read in the case when the data was written at minimum spin speed placing the sector as early as possible on the disk and then read back at maximum spin speed asserting the read gate signal as late as possible. As can be appreciated, the designer typically increases the size of the PLO field to insure proper data storage and retrieval. Unfortunately, this further reduces the amount of space on the disk available for data storage.

Consequently, there remains a need for a method or system for compensating for spin speed variation in the disk drive device of magnetic disk storage systems that more effectively utilizes the available data storage space on data storage media while providing high accuracy data storage and retrieval.

SUMMARY OF THE INVENTION

To address the spin speed variation problems of prior magnetic disk storage systems, the present invention uses each servo position field's actual detected location and measures the spin speed between servo position fields to synchronize the reading and writing of user data to the rotational position of the data storage media. This technique of using ongoing and real-time measurements of actual spin speeds, measuring the variations from a nominal or design spin speed, and applying a correction factor prior to the next data transfer operation enables the designer to optimize the storage space usage by employing smaller gaps and PLO fields.

According to one aspect of the invention, the present invention involves a method for use in a magnetic disk storage system for compensating for variation in spin speed of a data storage media, such as a disk, from a nominal or design spin speed. The method generally includes first providing the nominal spin speed for the data storage media in the particular magnetic disk storage system, with the nominal spin speed being stored in memory. The method continues with the measuring of the actual spin speed of the data storage media. In one preferred embodiment, this measurement is completed by measuring the time from one servo position field to the next sequential servo position field in a track on the data storage media. Next, the spin speed variation or error is determined by comparing the measured spin speed with the nominal spin speed. The method continues with applying a correction factor calculated based on the spin speed error to a data transfer parameter, such as channel reference frequency or gate assertion timing, prior to a subsequent data transfer process (i.e., a read or a write operation). In some embodiments, the method further includes verifying that the measured spin speed is within a range of spin speeds expected based on maximum spin speed change rates of the magnetic disk storage system, and if outside this range, the data transfer operation, i.e., a write operation, is blocked to prevent damaging data existing on the data storage media.

According to another aspect of the invention, a magnetic disk storage system is provided for adjusting data transfer parameters, such as channel reference frequency and read/write gate assertion timing, based on measured spin speed variation of data storage media rotated within the system. The system includes a read head selectively positionable adjacent to tracks in the data storage media for sensing when servo position fields pass by the head. In response, the head transmits a servo timing signal to an included controller. The controller receives a first and a second servo timing signal and determines the spin speed of the data storage media. The system further includes memory that stores the nominal or design spin speed for data storage media within the system. The controller is configured, with firmware and/or hardware, to determine spin speed error by comparing the measured spin speed with the nominal spin speed. To compensate for any variation in spin speed, the controller includes firmware and/or hardware to adjust at least one of the data transfer parameters, thereby correcting for spin speed error and increasing the efficiency of data storage.

DETAILED DESCRIPTION OF THE PREFERRED EMBODIMENTS

With the above summary of the invention in mind, a thorough discussion of the features of the inventive method and system will now be provided to assist the reader in understanding how the invention enables more efficient and complete usage of data storage space on a data storage media. An important feature of the invention is the ongoing, or at least periodic, measurement of the actual spin speed of the data storage media to determine an actual spin speed variation or error between servo position fields. In general, this information is fed into the read/write process such that as the read/write head moves between servo position fields adjustments can be made in real time to the reference frequency for reading and writing and to the write or read gate assertion point, as appropriate. The following description begins with an overview of the functional components of a magnetic disk storage system in which the invention is implemented and continues with a detailed discussion of the spin speed compensation method of the invention, which may advantageously be implemented within the magnetic disk storage system.

Figure 1:
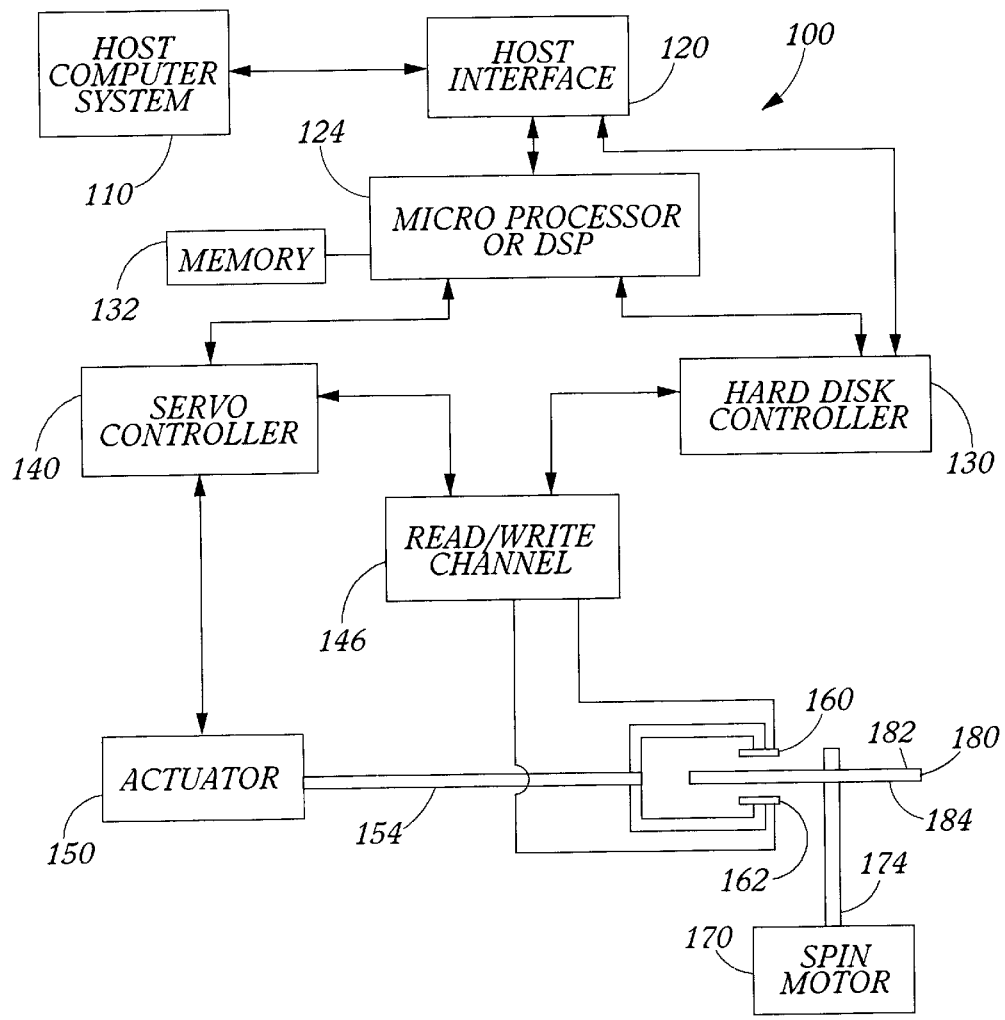
FIG. 1 is a schematic diagram of a magnetic disk storage system in which the present invention is implemented.

Referring to FIG. 1, a magnetic disk storage system 100 is illustrated that is useful for implementing the invention. It is understood by the inventors that the spin speed compensation method of the invention can be implemented within numerous other embodiments of magnetic disk storage systems which would be apparent to those skilled in the data storage arts and are considered within the breadth of this invention. As illustrated, the storage system 100 includes a host computer 110 that initiates data transfer operations by transmitting read or write requests to host interface 120, such as a small computer system interface (SCSI), an integrated drive electronics (IDE) interface, and the like. The host interface 120 in turn communicates the read/write request to the microprocessor or digital signal processor (DSP) 124 of the magnetic disk storage system 100.

The microprocessor or DSP 124 is the highest level of control and coordination for the read/write operations and data storage media operations executed by the magnetic disk storage system 100. The microprocessor or DSP 124 is communicatively linked to a servo controller 140 and a hard disk controller (HDC) 130. Preferably, the DSP 124 is configured to control and carry out the spin speed compensation method of the invention, as will be discussed in detail with reference to FIG. 4. In this regard, the DSP 124 may include logic circuits, firmware, software, registers, clocks, and other components (not shown) known in the field for performing the functions of the invention. Memory 132 is used for storing method-related input information, such as nominal spin speed and maximum spin speed change rate, and any look up tables or other information necessary for performing the spin speed compensation method, as well as for storing data storage media access and control information.

The servo controller 140 is a device that is controlled by the microprocessor or DSP 124 and uses feedback from read/write channel 146 to provide precise control of actuator 150. Actuator 150 is used for accurately positioning read/write heads 160 and 162 relative to the data storage media 180 (e.g., disk 180) with interconnected access arm 154. The read/write heads 160, 162 are standard devices used for reading (i.e., sensing) and writing (i.e., recording) data on magnetic media, such as the data storage or platter surfaces 182 and 184 of the disk 180. The disk 180 is mounted for rotation on spindle 174 that is rotated by spin motor 170 during operation of the magnetic disk storage system 100. The read/write heads 160, 162 are in communication with the read/write channel 146 which functions to pass data between the HDC 130, the servo controller 140, and the read/write heads 160, 162 (and, consequently, the disk 180). A single disk 180 is illustrated for clarity, but it should be understood that the invention may be incorporated in a much more complex magnetic disk storage system 100 that may include numerous disks 180 rotated on one or more spindles 174.

Figure 2:
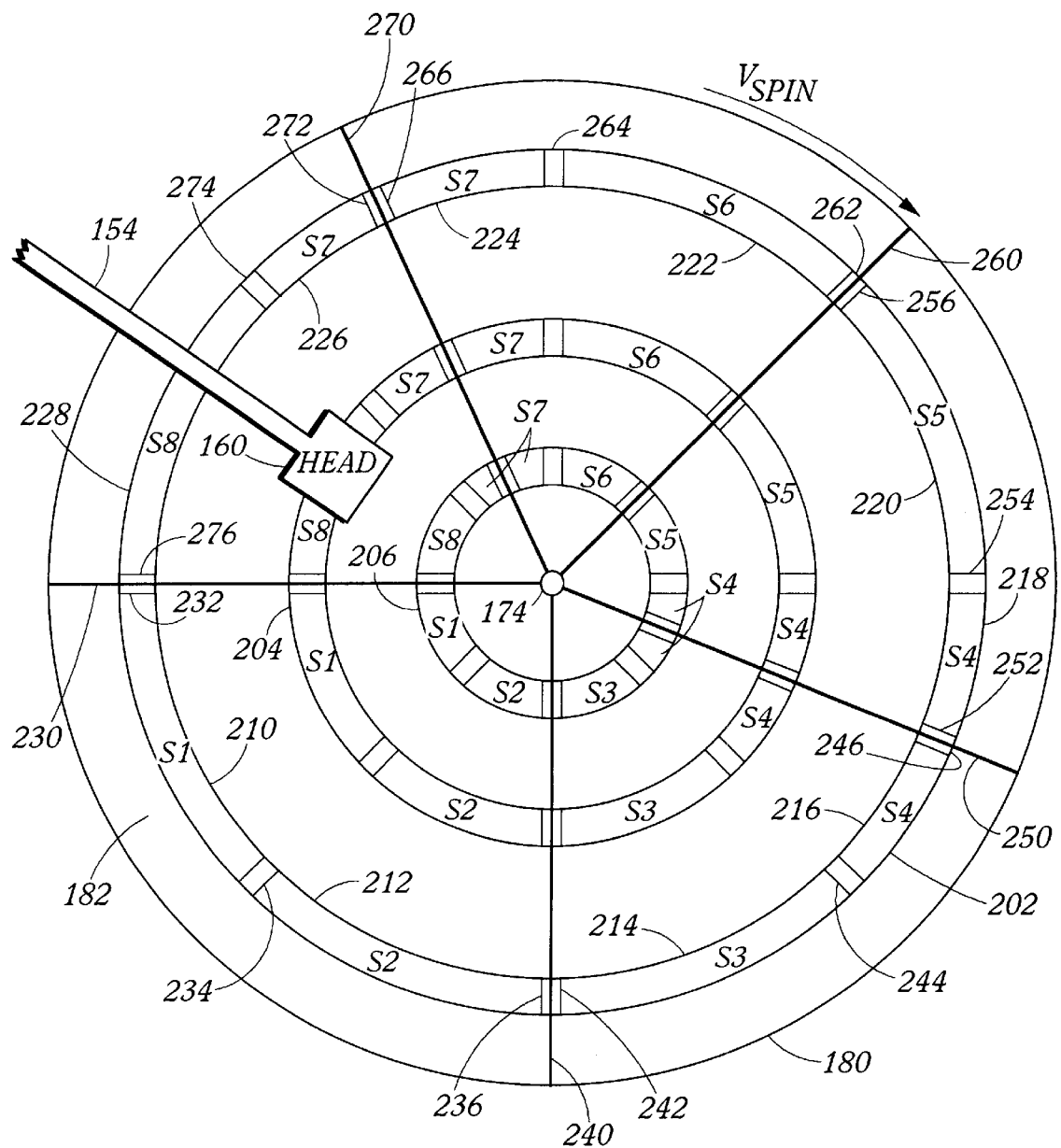
FIG. 2 illustrates the upper data storage surface of the magnetic storage media of FIG. 1.

FIG. 2 illustrates the upper data storage or platter surface 182 of the magnetic disk 180. The platter surface 182 includes concentric tracks 202, 204, and 206, with three tracks being shown for clarity only and not as a limitation. Data is written on and read from the circular storage tracks 202, 204, and 206 by the read/write head 160 which is selectively positioned (i.e., advanced and retracted) on the arm 154 by actuator 150 (shown in FIG. 1). As illustrated, each track 202, 204, and 206 is separated into a number of sectors (i.e., S1–S8). These sectors are used to contain or store user data and, although not shown, each sector typically contains a phase locked oscillator (PLO) field to allow synchronization of data transfer, as discussed in detail previously. The discussion will emphasize outer track 202 that includes sectors (S1–S8) 210, 212, 214, 216, 218, 220, 222, 224, 226, and 228. Sectors S4 and S7 are split sectors with a first and a second fragment 216, 224 and 218, 226, respectively.

Also shown in FIG. 2, the track 202 includes servo positioning fields 230, 240, 250, 260, and 270 which are data fields that provide radial and rotational position information that can be read by the read/write head 160. Significant to this invention, the servo positioning fields 230, 240, 250, 260, and 270 each include a servo timing mark that can be used to determine the time between the read/write head 160 detecting one servo position field and detecting a second servo position field (as will be discussed in detail with reference to the method of the invention and FIG. 4). In this regard, the disk 180 is rotated on spindle 174 during data transfer operations at a spin speed, $V_{SPIN}$. Also, significant to the measurement of the spin speed, $V_{SPIN}$, is the interval or distance, $d_s$, between the servo position fields. This distance, $d_s$, is typically a known, fixed value (which is often measured in microseconds at a given nominal or design spin speed, $V_{SPIN}$) that is established during initial configuration of the disk 180 in the factory setting and is not later changed by the user.

Figure 3:
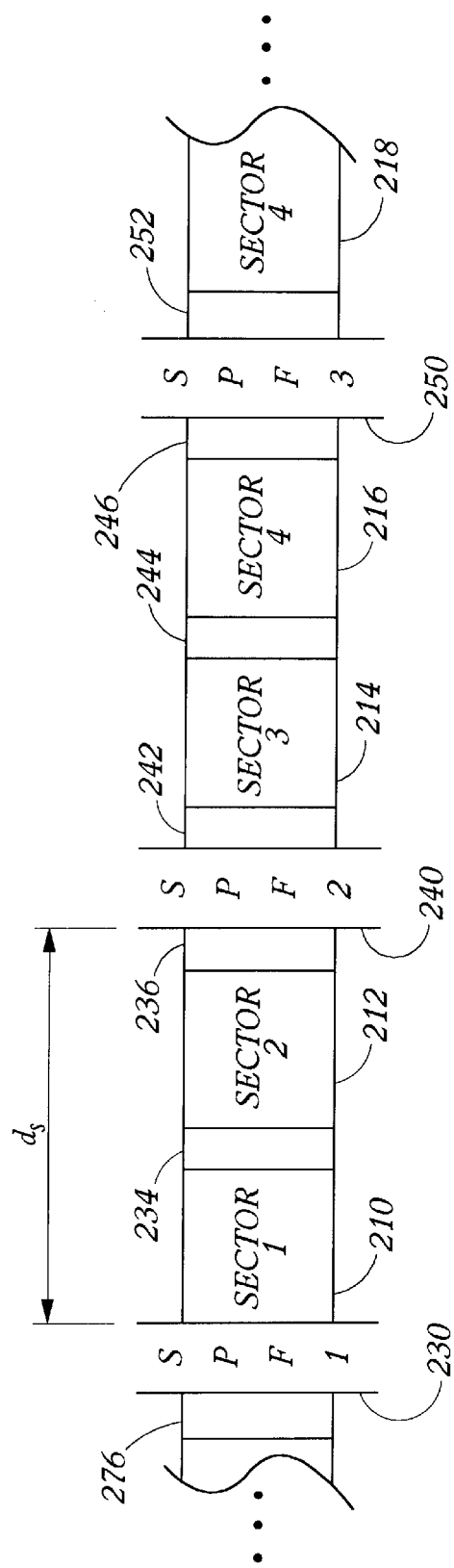
FIG. 3 is an enlarged, partial view of a single track of the storage surface of FIG. 2 illustrating servo position fields, sectors, and data storage gaps.

Referring to FIGS. 2 and 3, user data is recorded in track 202 in sectors 210, 212, 214, 216, 218, 220, 222, 224, 226, 228 (except in the PLO field, not shown). User data is not stored in the servo position fields 230, 240, 250, 260, and 270 or in the gaps 232, 234, 236, 242, 244, 246, 252, 254, 256, 262, 264, 266, 272, 274, and 276 which are included between sectors and between sectors and servo position fields to facilitate data transfer synchronization and to account for variations in spin speed, $V_{SPIN}$. The spin speed compensation method of the invention utilizes measurements of the actual spin speed variation rather than accounting for worst case variations based on expected tolerances. Consequently, the size of these gaps can be made relatively small to free up space in each track 202, 204, 206 for data storage (or to allow lower data densities to be used). Of course, additional formatting and information that is not shown for clarity of description is typically resident on a storage media, and these variations and equivalents are within the scope of the invention.

Figure 4:
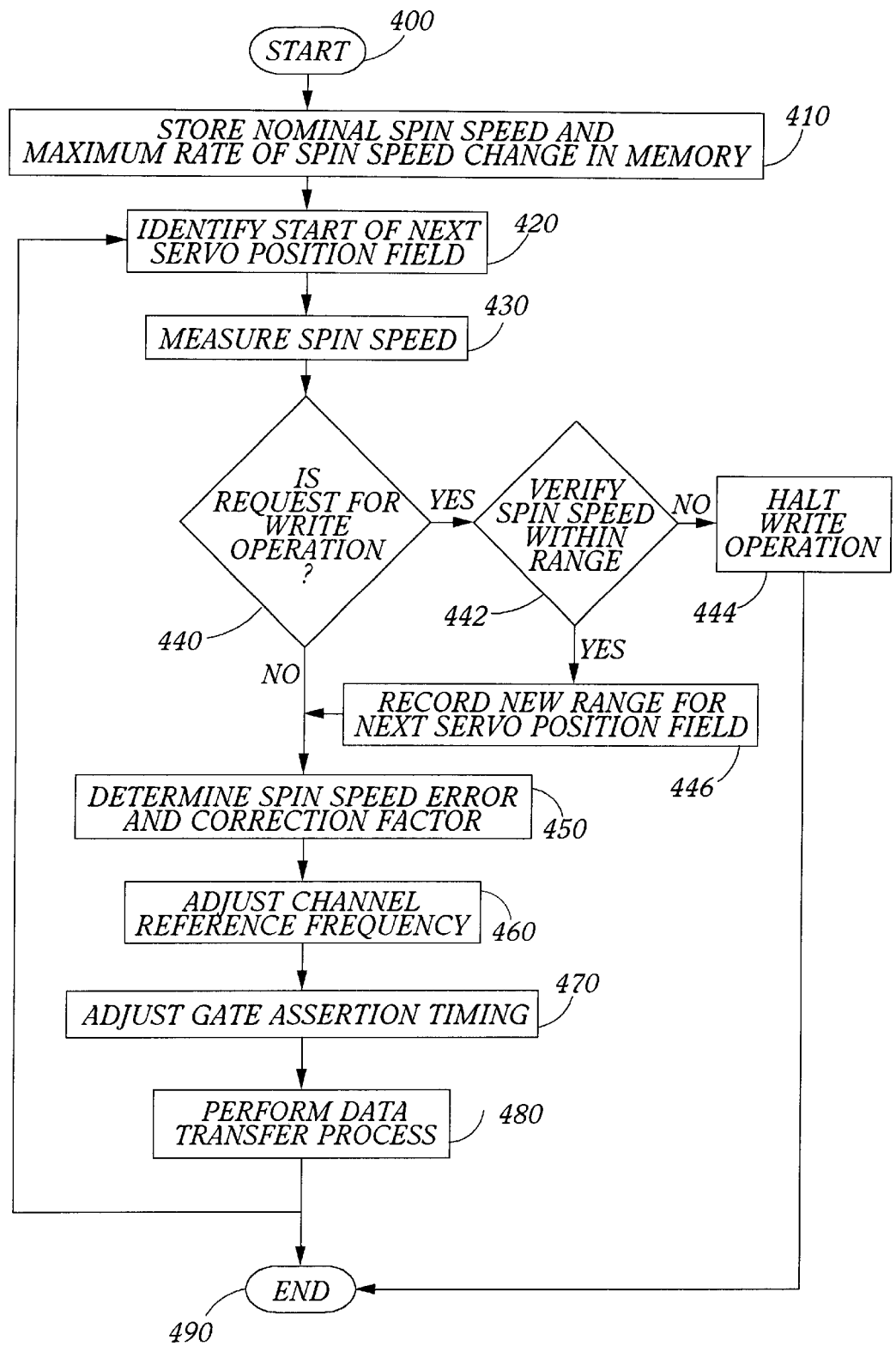
FIG. 4 is a flow chart illustrating a spin speed compensation method according to the present invention.

Referring to the flow chart in FIG. 4, an important aspect of the invention is the processes and functions performed by the magnetic disk storage system 100 for compensating for variations in spin speed, $V_{SPIN}$, of the disk 180 relative to the read/write heads 160, 162. The spin speed compensation method of the invention is initiated at 400 typically by a request from the host computer system 110 to the host interface 120 to transfer user data (i.e., a write or read operation). At 410, certain nominal or design operating parameters for the magnetic disk storage system 100 are entered to facilitate later calculations. As illustrated, these operating parameters include, but are not limited to, the nominal spin speed for disks 180 and the maximum rate of spin speed change for the spin motor 170. Typically, the maximum rate of spin speed change is determined based on the characteristics of the spin motor 170, the dynamics of the motor control loop (not shown), and other operating environment factors. The operating parameters preferably are stored in memory 132 for later use. Of course, the entering of the operating parameters may be performed prior to the beginning of the spin speed compensation method, and typically is only repeated upon a change in the components of the magnetic disk storage system 100 or a change in the operating environment.

At 420, the compensation method continues with the read/write head 160 (or 162) being operated to monitor for the start of the next sequential servo position field. For example, as illustrated in FIGS. 2 and 3, the read/write head 160 has passed the servo position field 270, and the timing information from this servo position field 270 has been stored in memory 132 by the HDC 130. Now, the HDC 130 uses the read/write head 160 to monitor for and identify the occurrence of the servo position field 230. At 430, when the next servo position field (such as SPF 230) is detected, a measurement of the spin speed, $V_{SPIN}$, is completed by the HDC 130 (although the logic can be located in other components of the system 100). The measured or determined spin speed, $V_{SPIN}$, is stored in memory 132.

Although many techniques can be employed to measure or determine spin speed, $V_{SPIN}$, a preferred method is to measure the amount of time since the previous servo position field. This measurement can be readily completed using timer resources and components (not shown) that are commonly included in the hardware of magnetic disk storage systems 100. Typically, a servo position timer provides a cycle count value and simultaneously, begins timing again for the next servo position field. The timers used for this function vary but are often referred to as "input capture" timers because they capture the value of a free-running counter based on the input of an event (i.e., a servo position field detection). The number of cycles between detected servo position fields has a direct correlation to time and can be converted to time through hardware or software and/or related to distance, $d_s$, between servo position fields (see FIG. 3). Alternatively, as will be discussed in more detail below, the number of cycles can be converted to a spin speed error (or variation) value that is utilized in compensating or adjusting data transfer parameters to improve operation of the magnetic disk storage system 100.

According to another significant aspect of the invention, the method is designed to protect data on storage media that can be caused by mistimed writing operations. This added data protection is achieved by verifying that the spin speed, $V_{SPIN}$, determined at 430 is within acceptable (i.e., anticipated and compensated for) spin speed ranges. In this regard, the measured spin speed, $V_{SPIN}$, of 430 represents the average spin speed, $V_{SPIN}$, over the period of time that just elapsed as the disk 180 was rotated adjacent read/write head 160 between two servo position fields. However, adjustments or corrections to operating parameters such as gate assertion timing and recording frequency are applied to a data transfer operation in the next approaching data sector. In other words, the correction typically lags behind by about the amount of time between servo position fields. Consequently, if the spin speed, $V_{SPIN}$, is changing as the disk 180 is rotated to the next data sector, the actual measured spin speed, $V_{SPIN}$, in 430 will not precisely coincide or match the spin speed used for applying correction factors to the data transfer parameters. This potential mismatch of actual spin speed and "correction" spin speed may effect the accuracy of data transfer.

Taking this spin speed change into account, the method continues at 440 with the determination of whether the data transfer request from the host computer system 110 is for a write operation. Note, the verification procedure is typically only applied to write operations because read operations do not threaten data existing on the disk 180 and typically included technology will provide error information for mistimed read operations. If the request is for a write operation, spin speed verification continues at 442 with the comparison of the measured spin speed, $V_{SPIN}$, from 430 to a range of expected spin speeds. This acceptable range was determined from the previous measurement at 430 and the maximum rate of spin speed change stored in memory 132. If the spin speed, $V_{SPIN}$, changed more than allowed or is outside the range, the write operation is halted at 444. If within range, a new acceptable range is created with the most recent measured spin speed, $V_{SPIN}$, and stored in memory 132 for the next comparison.

To further explain the verification step at 442, the following example is provided. A magnetic disk storage system 100 may be designed for a nominal spin speed of 10,000 cycles between servo position fields. The measured spin speed, $V_{SPIN}$, measured at 430 for the last detected servo position field may be high such that there are fewer than nominal, such as 9,970, cycles between servo position fields. If the maximum spin speed change rate for the system 100 is +/−0.05%, the acceptable range for spin speed, $V_{SPIN}$, at the next servo position field will be 9,965 to 9,975 cycles based on the measured 9,970 cycles between the previous two servo position fields. This range is stored at 446 for use in the next verification step 442. Now, if the next measured spin speed, $V_{SPIN}$, at 430 is outside this range, a write operation based on any corrections or adjustments may be mistimed in placement and frequency. The method includes a halt write operation step 444 to prevent damage to user data on the disk 180.

The verification functions of the system 100 can readily be implemented in hardware or firmware. For example, a firmware implementation may comprise comparing the measured spin speed, $V_{SPIN}$, to the minimum and maximum spin speeds. These maximum and minimum values may be calculated values, as described above. Alternatively, the values may be determined initially based on nominal spin speeds, tolerances, and spin speed change rates and then stored in look up tables. A hardware implementation may include components that compare the measured spin speed, $V_{SPIN}$, with the minimum and maximum spin speed values determined at the previous servo position field and stored in a register(s).

The spin speed compensation method continues at 450 with the determination of a spin speed error and correction factor for use in correcting data transfer parameters. The calculation of spin speed error is generally expressed by the following: Error=(nominal $V_{SPIN}$−measured $V_{SPIN}$)/nominal $V_{SPIN}$. For example when the spin speed, $V_{SPIN}$, is measured in cycles, if the nominal time between two servo position fields is 100 microseconds and an included reference clock for the servo position timer operates at 100 megahertz, there is nominally 10,000 clock cycles between servo position fields. Consequently, if the measured time between two servo position fields is 9,970 cycles, the disk 180 is spinning 0.3% faster than nominal. In contrast, if the actual measured time between two servo position fields is 10,030 cycles, then the disk 180 is spinning 0.3% slower than nominal. The correction factor is a factor that is applied to (i.e., multiplied by) the data transfer parameters to correct for the above spin speed errors. A generalized formula for the correction factor is: 1/(1+error). In the above example of a disk 180 spinning too fast, the correction factor would be: 1/(1+0.003) or 1/1.003.

Referring again to FIG. 4 at 460 and 470, while a number of data transfer parameters may be adjusted to compensate for spin speed error, the method emphasizes the importance and need for altering the gate timing and channel reference frequency to obtain accurate read/write operations despite spin speed variations. The adjustments to these data transfer parameters are preferably closely related to the variation of the measured spin speed, $V_{SPIN}$, from the nominal spin speed. For example, if a positive spin speed error of 0.3% is detected (i.e., indicating that the disk 180 is spinning 0.3% too fast), the read or write gate assertion point preferably is altered to occur 0.3% sooner and the reference frequency for the data transfer is increased by 0.3%, too. In some system 100 designs, the same recording frequency reference clock is also used as the reference clock that controls gate assertion timing. In these systems 100, it is only necessary to adjust the reference clock frequency, and gate assertion timing is automatically adjusted (i.e., step 460 could be eliminated). Numerous implementations of applying the correction factors to the data transfer parameters will be apparent to those skilled in the art. Consequently, in the following discussion, only two firmware implementations and a single hardware implementation are provided with emphasis on adjusting the gate assertion timing to provide further explanation of the invention but not as a limitation to the scope of the inventive method.

Systems 100 in which read/write gate timing is controlled by a timer system with an independent clock typically rely on a numeric value to be placed in a register that specifies the number of clock cycles from servo position field detection to the gate assertion point. To apply a correction factor in these types of systems 100, the nominal value that would be placed into the timer register is adjusted before being placed into the timer register. For example, a positive spin error of 0.2% may be measured in a system 100 with a nominal number of clock cycles (such as 15,000) before gate assertion for an upcoming data sector. In this case, the corrected or adjusted value placed into the timer register is 15,000 cycles multiplied by a correction factor of 1/1.002 or 14, 970 cycles. In equation format, the correction is:

Adjusted Value=Nominal Value X 1/(1+error)

As mentioned previously, this correction step is not needed in designs that use the same clock for timing of read/write gate assertion and for channel recording frequency (assuming the clock for channel recording frequency was previously adjusted). Additionally, the channel recording frequency (or PLO reference frequency in the case of a read operation) is generally also controlled by register values. This control typically includes two registers (a divisor and a dividend) such that adjustment to the frequency is more computation intensive, with the exact method of calculating the new register values (i.e., adjusted frequency values to compensate for spin speed variation) being highly dependent on the particular design of the channel synthesizer. Because this computation would be apparent to those skilled in the art, further discussion is not needed to understand the features of the invention.

In some systems 100, computation speed is a scarce resource while memory space is more abundant. In this situation, a preferred firmware implementation is to use a look-up table stored in memory 132 and indexed by the determined spin speed error (from 450). The following is such a look-up table created for a system 100 that has a nominal spin speed of 10,000 cycles and a tolerance of 0.3% such that the expected range of spin speeds is 9,970 to 10,030 cycles:

|          | Sector 0    | Sector 1    | Sector 2    | ... | M/N         |
|----------|-------------|-------------|-------------|-----|-------------|
| Entry 0: | nom − 0.3%  | nom − 0.3%  | nom − 0.3%  |     | nom + 0.3%  |
| Entry 30:| nom         | nom         | nom         |     | nom         |
| Entry 60:| nom + 0.3%  | nom + 0.3%  | nom + 0.3%  |     | nom − 0.3%  |

Although many entries are not shown, the table is a 61 entry (i.e., an entry for every even number of cycles possible) look-up table that contains in each entry the corrected or adjusted values for the registers that control the gate assertion and/or channel frequency. The index to this look-up table is calculated by subtracting the lowest possible spin speed or 9,970 cycles from the actual measured clock cycles between servo position fields.

In the above exemplary table, entry 30 provides the nominal values for gate timing for all sectors which begin between the current servo position field and the next servo position field when the measured spin speed, $V_{SPIN}$, is 10,000 cycles or nominal (i.e., 10,000−9,970=30). If the measured spin speed, $V_{SPIN}$, is 9,970 cycles, the index is 0, and entry 0 is used to adjust data transfer parameters. The gate timing values are reduced by 0.3% from nominal spin speed (stored in memory 132) to move the gate assertion point to an earlier location in the approaching sectors, thereby compensating for the higher spin speed, $V_{SPIN}$. The M/N values are used to generate a channel reference frequency that is 0.3% higher than nominal to also match the higher spin speed. As a further illustration, if the measured spin speed, $V_{SPIN}$, is 10,030 (minimum spin rate), the index is 60 and entry 60 is used for adjustments. The gate timing values are increased by 0.3% over nominal to move the gate assertion to a later point to compensate for the lower spin speed, $V_{SPIN}$, and the channel reference frequency is lowered by 0.3% from nominal to obtain correct read/write timing. While the computation process and look-up table process were provided as separate adjustment techniques, they may readily be used in combination depending on the available processor bandwidth and memory resources.

The adjustments of channel reference frequency and gate assertion timing may also be completed via a hardware implementation. For example, spin speed errors may be compensated for by adjusting the nominal clock cycles before read/write gate assertion. In one embodiment, the spin speed, $V_{SPIN}$, is measured with a hardware counter (not shown). This counter is incremented using a fixed frequency clock and is reset every time a servo position field is detected. Upon resetting the counter, the maximum count is latched into a servo period register that contains a value that is proportional to the most recent spin speed, $V_{SPIN}$.

This same hardware counter also provides the time base for generating the read/write gate timing. A hardware comparator tests the hardware counter value for equality to a target count to determine when a gate assertion is made. To compensate for spin speed errors, this target count is calculated or determined by dedicated hardware every time the spin speed, $V_{SPIN}$, is measured at 430, according to the following formula:

$$\text{Target Count} = \frac{\text{Nom Gate Assertion Count} \times \text{Latched Servo Period Count}}{\text{Nominal Servo Period Count}}$$

The target count preferably is recalculated whenever the nominal gate assertion count or the nominal servo period count is updated. Note, this adjustment properly orients the sector start time rotationally to the servo position field and assumes the channel reference frequency is operating on a separate timing clock. Consequently, to realize greater benefit from the adjustment or compensation, the channel reference frequency clock should also be adjusted to change the recording or reading frequency to compensate for spin speed errors.

Once the adjustments to the data transfer parameters have been completed, the method continues at 480 with the performance of the requested data transfer process. With the adjusted parameters, such as channel reference frequency and gate assertion timing, the data transfer process is accurately completed for the sectors between the last servo position field and the next servo position field. Once the data transfer process is completed at 480, the method continues by returning to 420 to watch for and identify the next servo position field. Once identified, the method of compensating continues so as to provide an ongoing compensation technique for addressing the problem of spin speed variation in a magnetic disk storage system 100.

From the above discussion, it can be understood that the present invention allows a designer to reduce the size of gaps between data sectors and between data sectors and servo position fields and also, to reduce the size of PLO fields, thereby significantly increasing the capacity of a storage media or allowing the same amount of data to be stored on a storage media with lower data densities. While prior art designs used spin speed tolerances to select gap and PLO field sizes, the present invention effectively allows the gaps and PLO fields to be established based on the maximum spin speed variation or error from one servo position field to another sequential servo field. As can be appreciated, this variation is generally a much smaller number than the tolerances which allows the gaps and PLO fields to be smaller. Because the tolerances are not employed, designers can also build in larger tolerances to reduce cost without significantly reducing the data storage capacity of the storage media.

Further, although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the present method can readily be applied to measure the spin speed variation periodically rather than between each consecutive pair of servo position fields (e.g., the error may be calculated between every third, fourth, and the like servo position fields). Of course, the effectiveness of the compensation achieved would be slightly less and may require more tolerances to be designed into the magnetic disk storage system, such as using slightly larger gaps and PLO fields.

We claim:

1. A method for compensating for variation in spin speed from a nominal spin speed in a magnetic disk storage system including a data storage media rotatable at a spin speed, the method comprising:

providing the nominal spin speed of the data storage media in the magnetic disk storage system;

measuring the spin speed of the data storage media;

determining a spin speed error based on the provided nominal spin speed and the measured spin speed; and prior to a data transfer process in the magnetic disk storage system, applying a correction factor based on the spin speed error to at least one data transfer parameter used to control the data transfer process, wherein the at least one data transfer parameter is channel reference frequency.

2. The method of claim 1, wherein the measuring of the spin speed includes detecting a first servo position field and a second servo position field on a track in the rotating data storage media.

3. The method of claim 2, wherein the measuring further includes determining the number of cycles between the first and the second servo position fields.

4. The method of claim 2, wherein the first and the second servo position fields are adjacent ones of the servo position fields.

5. The method of claim 1, wherein the applying further includes applying the correction factor to the data transfer parameters of write gate assertion timing and read gate assertion timing.

6. The method of claim 1, wherein the applying of the correction factor includes retrieving an adjusted data transfer parameter value from a look-up table indexed based on the measured spin speed compared to the nominal spin speed.

7. The method of claim 1, wherein the spin speed measuring is performed with a hardware counter device, the hardware counter device being further configured for providing timing information for the applying of the correction factor.

8. The method of claim 1, further including providing a maximum spin speed change rate for the magnetic disk storage system and verifying the determined spin speed is within an acceptable spin speed range, wherein the acceptable spin speed range is determined by applying the maximum spin speed change rate to the measured spin speed.

9. The method of claim 8, wherein the data transfer process is a write operation, and further including interrupting the data transfer process when the determined spin speed is outside the acceptable spin speed range.

10. A magnetic disk storage system for adjusting data transfer parameters to correct for spin speed variation of data storage media rotated within the magnetic disk storage system, the data storage media being separated into tracks having data sectors and servo position fields, comprising:

a read head positioned adjacent the data storage media for detecting when the read head is adjacent one of the servo position fields and, in response, transmitting a servo timing signal;

a controller communicatively linked to the read head for receiving a first and a second of the servo timing signals corresponding to a first and a second of the servo position fields; and a memory device for storing data and linked to the controller, the memory device having in storage a nominal spin speed value for the magnetic disk storage system;

wherein the controller is configured for measuring a spin speed of the data storage media using the first and the second servo timing signal, for determining a spin speed error by comparing the nominal spin speed value to the measured spin speed, and for adjusting at least one of the data transfer parameters to correct for the spin speed error;

wherein the memory device further includes a maximum spin speed rate change value for the magnetic disk storage system and wherein the controller is adapted for verifying the measured spin speed is within an acceptable spin speed range that is established by the controller by applying the maximum spin speed rate change value to the measured spin speed; and wherein the controller includes means for determining whether a requested data transfer operation is a write operation and wherein the controller is operable to halt the write operation when the measured speed spin is outside the acceptable spin speed range.

11. The apparatus of claim 10, wherein the controller includes a counter for performing the spin speed measuring by counting a number of cycles between the receipt of the first and the second servo timing signal.

12. The apparatus of claim 10, wherein the first servo position field is adjacent the second servo position field.

13. The apparatus of claim 10, wherein the data transfer parameters are selected from the group consisting of channel reference frequency, write gate assertion timing, and read gate assertion timing.

14. The apparatus of claim 10, wherein the memory device further includes a look-up table of adjusted data transfer parameters determined based on the nominal spin speed and an anticipated range of values for the measured spin speed.

* * * * *